United States Patent [19]

Tillman, Jr., et al.

[11] Patent Number: 5,453,049

[45] Date of Patent: Sep. 26, 1995

[54] CORNER AIR FILTRATION UNIT

[75] Inventors: Bernard W. Tillman, Jr., Houston; Van B. Smith, Jr., Spring, both of Tex.

[73] Assignee: Isolate, Inc., Houston, Tex.

[21] Appl. No.: 200,201

[22] Filed: Feb. 23, 1994

[51] Int. Cl.$^6$ .......................................................... F24F 3/16
[52] U.S. Cl. ...................... 454/228; 55/279; 55/385.2; 55/467; 55/471; 422/24; 422/121; 454/230; 454/231; 454/234; 454/341
[58] Field of Search .................................. 55/279, 385.2, 55/467, 471; 454/228, 230, 231, 234, 341, 346; 422/24, 121

[56] References Cited

U.S. PATENT DOCUMENTS

| | | | |
|---|---|---|---|
| 1,921,900 | 8/1933 | Wood | 454/234 |
| 3,080,695 | 3/1963 | Hay | 454/346 X |
| 3,347,025 | 10/1967 | Wiley | 454/231 X |
| 3,482,503 | 12/1964 | Jenn | 454/228 |
| 4,210,429 | 7/1980 | Golstein | 55/279 |
| 4,370,155 | 1/1983 | Armbruster | 454/230 X |
| 5,225,167 | 7/1993 | Wetzel | 55/279 X |

FOREIGN PATENT DOCUMENTS

| | | | |
|---|---|---|---|
| 41667 | 12/1981 | European Pat. Off. | 454/230 |

OTHER PUBLICATIONS

1993 Farr "Farr Cleanroom Products" *Brochure* Technical Data Bulletin CR–005.
1993 Enviro "Envirco HOSPI–GARD: Reduces the Risk of Communicable Respiratory Diseases" *Brochure*.
1991 EACI/Envirco "Product Data: Mac 10 HEPA Ceiling Grid Module" *Brochure* Bulletin 0706191–3M.
1990 Farr "ZEPHYR Portable Fume and Dust Collection System" *Brochure* Bulletin No. B–1000–16B.
1991 Farr "CAM–FARR IAQC Air Purifier" *Brochure*.
Miller–Picking "Custom–Built HVAC Equipment by Miller Picking" *Brochure*.
Hemco "Unilab Innovative Environmental Enclosures for Science and Industry" *Brochure*.
Component Systems, Inc. "ISOLAIDE Isolation Rooms and Chambers" *Brochure*.
Component Systems, Inc. "ISOLAIDE Ventilation/Filtration Unit" *Brochure*.
Enviro–Free Systems "The Answer to Commercial Indoor Air Quality" *Brochure* Aire Sentry III.
Quality Air Control, Inc. "Penpek II HEPA Filter Blower Unit Application 'B'" *Brochure*.
Tri–Dim "Absolute Contamination Control Equipment" *Brochure* ACCU.
Metal–Fab, Inc., Micro Air Air Cleaners: "Model SC 150 Cleaner Air for Industry" *Brochure*.
EACI/Envirco "Process Isolation Modules" *Drawing*.

*Primary Examiner*—Harold Joyce
*Attorney, Agent, or Firm*—Pravel, Hewitt, Kimball & Krieger

[57] ABSTRACT

Air purification or filtration unit having a triangular housing, with the open front face being the hypotenuse of the triangle. The unit is particularly adaptable for use with conventional sized high efficiency particulate air, or HEPA filters and low penetration air, or ULPA filters, to create a highly filtered clean air environment. The unit includes a circulating fan within the housing to draw air through the filters and housing and to exhaust the air through the top housing wall for recirculation, and can also be ducted to exhaust filtered air from the environment, either in whole or in part. A germicidal ultra violet light may be placed within the housing for additional air purification.

20 Claims, 2 Drawing Sheets

FIG.1
FIG.2
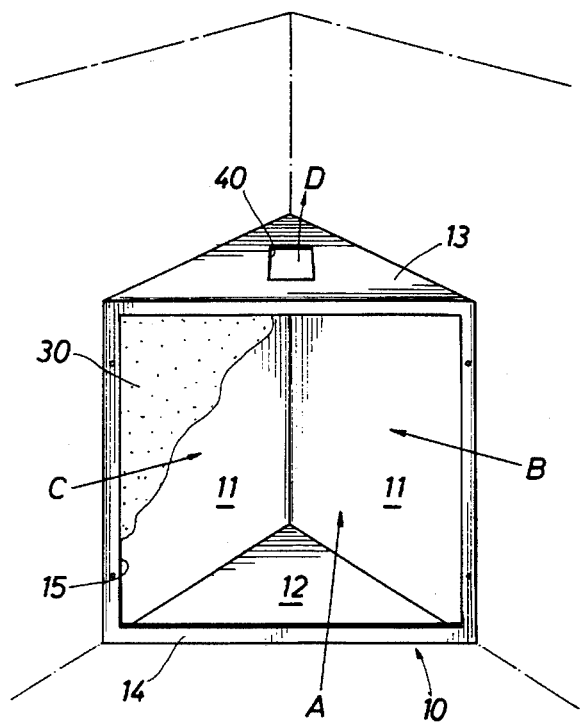
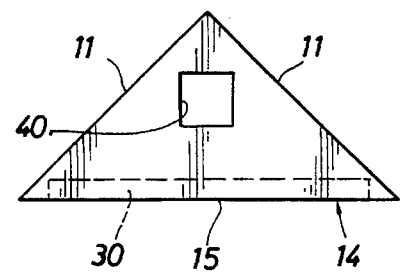
FIG.3
FIG.4
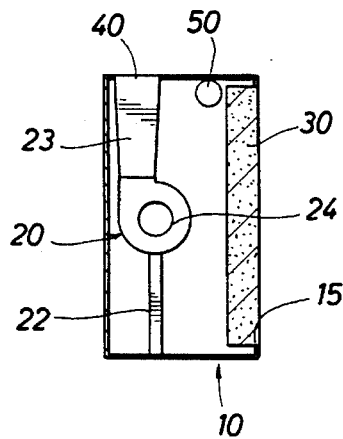
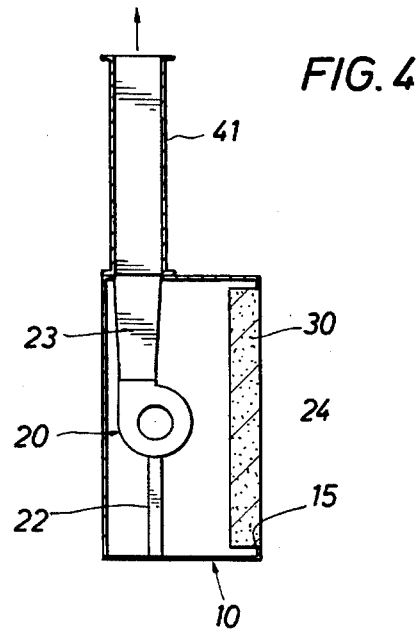

CORNER AIR FILTRATION UNIT

SPECIFICATION

1. Field of the Invention

This invention relates to air filtration units.

2. Background of the Invention

Air in hospitals, laboratories, correctional facilities or special service environments frequently contains not only airborne dust particles, but also bacteria and microorganisms that spread disease. Such microorganisms could cause infectious diseases like pneumonia, tuberculosis, herpes and hepatitis B, and the common cold. When a person coughs, sneezes or speaks, he can expel airborne particles or "droplet nuclei." If the person expelling has contracted an infectious disease, such as tuberculosis, these droplet nuclei may contain TB bacteria, which then can become aerosolized as droplets.

Droplet nuclei can remain airborne for long periods, up to hours, which increases the possibility they can be inhaled by another person. Anyone breathing air contaminated in this manner can become infected. Stable droplet nuclei can range from 1 to 4 microns in size. Individual tuberculosis bacilli is rod shaped and can vary in width from 0.2 to 0.6 microns, and from 0.5 to 4.0 microns in length. Any concentration of aerosolized droplet nuclei containing tubercle bacilli is assumed to provide some infection risk. Health care workers providing clinical and diagnostic procedures, examinations and autopsy activities are at greater risk due to the nature of their services. Outpatient clinics, emergency rooms, correctional facilities, homeless shelters and other locations of first contact with an infected person are places of particular concern. It therefore would be desirable to be able to filter the air in these high risk areas to remove air borne infections materials as far as possible to diminish the risk of infection to those exposed in such high risk areas.

Although isolation rooms for patients with infectious diseases are available, such rooms are generally specially designed, or at least structurally retrofitted, to provide a negative pressure isolation room using central ventilation system equipment. For burn patients undergoing skin grafts or a cancer patient undergoing chemotherapy and/or bone marrow transplants, positive pressure isolation rooms are specially designed or retrofitted using central ventilation system equipment. In connection with such isolation rooms, as well as hospital and industry clean rooms, high efficiency particulate air or HEPA filters or ultra low penetration air or ULPA filters have been used to filter the air, which is exhausted from the room through ceiling ducts.

When an air stream passes through an HEPA or ULPA filter, there is a significant added pressure drop. Central plant central station fan equipment may not be able to overcome the added pressure drop created by these filters. Although with new construction, fan equipment can be added for specific rooms that are wanted for isolation purposes, with older structures this would require significant and expensive construction involving tearing down and rebuilding ceilings and possibly walls, and additional wiring, to put the additional fans within the exhaust system.

It would therefore be desirable to have a portable unit that could transform an existing hospital waiting room, treatment room or other room into a highly filtered clean area without the need for retrofitting or reconstruction.

SUMMARY OF THE INVENTION

The present invention provides a compact, portable air filtration unit capable of rapid and efficient room air turnover and recirculation of HEPA or ULPA filtered air. The filtration unit includes a generally triangular housing with an open front face, with the housing sized to fit neatly in the corner of a room. The housing includes means for mounting a filter medium over its open front face and a fan assembly mounted within the housing. A top opening is provided in the housing for exhausting air drawn by the fan through the front opening and the filter medium, and out of the top opening. The unit can be additionally provided with a germicidal ultra-violet lighting element between the filter and fan to provide added decontamination of the filter within the housing or plenum, and with a speed control device to adjust the speed of air flow through the unit.

BRIEF DESCRIPTION OF THE DRAWINGS

FIG. 1 is a front isometric view showing a preferred embodiment of a housing or plenum for a single filter unit embodiment of the invention. The arrows labeled A, B, C and D illustrate the pattern of air flow into and through the housing.

FIG. 2 is a plan view of the housing of FIG. 1.

FIG. 3 is a side, cross-sectional view of an embodiment of the invention for directly returning room air.

FIG. 4 is a side, cross-sectional view of an embodiment of the invention for exhausting room air through a ceiling ventilation port to a central ventilation exhaust system.

DETAILED DESCRIPTION OF PREFERRED EMBODIMENT

Figure 5:
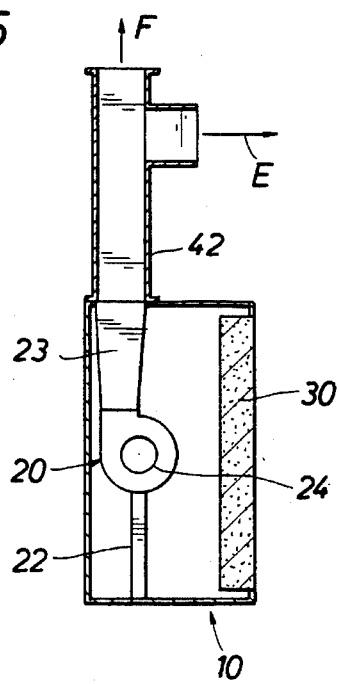
FIG. 5 is a side, cross-sectional view of an embodiment unit of the invention for exhausting part of the room air though a ceiling ventilation port to a central ventilation exhaust system and returning part to a room.

As shown in FIGS. 1 and 2, the air filtration unit of the present invention is designed to fit compactly into the corner of a room, and to efficiently and quickly draw room air low into the unit from along the floor and along the walls adjoining the corner. The basic components of the unit are a housing 10, fan 20, filter assembly 30 and exhaust port or outlet 40.

With reference to FIGS. 1 and 2, the housing 10 includes two sidewalls 11, a triangular bottom wall or base 12, and triangular top wall 13. Front face 14 of the housing includes a front opening 15 constructed to mount one or more filter assemblies 30 over the opening 15. The top wall 13 includes the outlet 40.

As shown in FIGS. 3 through 6, the unit includes a circulating fan assembly 20 mounted within the housing 10. As shown, the fan assembly 20 is mounted within the housing 10 by way of a support post or pedestal 22. However, the invention is not limited to this type of mounting. As can be appreciated, the fan assembly 20 can be supported within the housing by any suitable mounting, such as brackets, which secure the fan assembly within the housing. As can further be appreciated, the fan assembly 20 is preferably mounted so that its intake port is located close to the center of the housing 10 so that it will draw air relatively evenly throughout the entire front opening 15.

The fan assembly 20 can be any type of circulating fan, including a centrifugal, axial or plenum type fan. For purposes of minimizing noise from the unit while running, the fan assembly is preferably one which is constructed with the fan motor isolated from the housing by way of shock absorbing means, such as rubber-in-sheer grommets. The fan assembly is connected to the exhaust opening by any suitable discharge duct 23. The capability to control the fan speed may be provided by way of a control means 28 discussed below.

Figure 7:
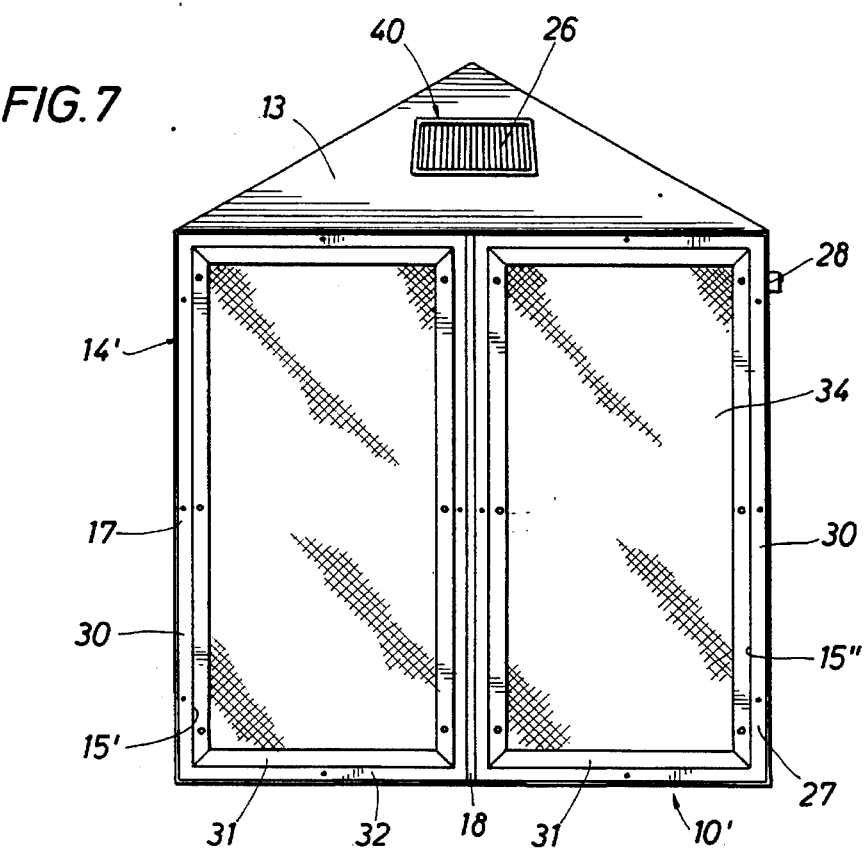
FIG. 7 is a front isometric view of a dual filter embodiment of the invention.

To enable the unit to function as a high efficiency air purifier for removing airborne infectious contaminates, the filter assembly 30 should include either a HEPA or ULPA filter. HEPA and ULPA filter assemblies are commercially available in a nominal 2-foot by 4-foot rectangular shape. As best shown in FIG. 7, such assemblies typically include a two-piece unit with the filter medium mounted in a first frame 31, which has a resilient material about its edge, and a second frame 32 having a knife edge that fits snugly against the resilient material of the first frame 31. These filters have a nominal eight-square-foot filter medium face surface area. A HEPA filter can filter particulates as small as 0.3 microns and an ULPA filter as small as 0.12 microns.

To accommodate such commercially available filter assemblies, the housing 10 is preferably sized with its front face having a slightly larger perimeter size than the perimeter size of commercially available assemblies. For example, a single filter unit having a housing 10 such as shown in FIG. 1 constructed to accommodate a single, nominal 2-foot by 4-foot filter assembly would have a front housing face 14 of approximately the same size. A double filter unit such as shown in FIG. 7 would have a housing 10' which includes two front openings 15' and 15", rather than one, separated only by a strip of front face, such as strip 18, of sufficient width to mount each of the filter assembly frames 32 side-by-side as shown. The width of the front face then provides the hypotenuse of the triangular shape of the unit.

Although any means can be used to mount a filter assembly to the front face 14 or 14' of the housing, the filter assembly should be easy to remove and replace with fresh filters, without the need for pre-filters. Accordingly, as shown, the housing can be provided with threaded holes 17 for receiving the thumb screws, cap nuts, winged nuts or the like, such as are typically provided to hold a filter assembly within a ceiling mounted central ventilation system opening.

As can be appreciated, the size or capacity of the fan assembly depends on the size of the housing and the size of the room in which air purification is desired, and the extent of purification needed. The American Society of Heating, Refrigeration and Air Conditioning Engineers or ASHRAE has published recommendations for ventilation in Tuberculosis (AFB) isolation rooms. These recommendations specify that such rooms should have at least six (6) total air changes per hour, including at least two (2) outside air changes per hour, with sufficient within-room air distribution to dilute or remove tuberculosis bacilli from locations where healthcare facility personnel or visitors are likely to be exposed. ASHRAE recommends that emergency rooms, waiting rooms, and the like have at least ten (10) air changes per hour. The recommended air changes for trauma rooms are twelve (12) air changes per hour, five (5) of which should be outside air.

The LEGI-SLATE Report for the Federal Register, L-S ID Number 471062 (4506 lines), Page: 58 FR 52810 NO. 195, dated Oct. 12, 1993, by the Department of Health and Human Services, Centers for Disease Control and Prevention, provides a draft of guidelines for preventing the transmission of tuberculosis in health care facilities. Table S3-1 of that report shows how many air changes per hour and time in minutes are required for removal efficiencies of 90%, 99% or 99.9% of airborne contaminants. That report states that with 6 air changes/hour, it takes 69 minutes to reach a 99.97% removal efficiency; at 10 air changes/hour, it takes 41 minutes to reach a 99.97% removal efficiency; and at 20 air changes/hour, it takes 21 minutes to reach a 99.97% removal efficiency. The particular illustrated embodiments are designated to achieve 20 air changes per hour for a typical room installation.

As can be appreciated, power consumption, unit noise and the room size, and hence volume of air to be filtered, are all design factors to be considered in choosing a particular fan for a particular size unit. For example, to provide 20 room air changes per hour in a room having a 15 foot by 20 foot floor area and an 8 foot ceiling would require moving 2,400 cubic feet of air in 1 hour, or sixty minutes. The following table illustrates an example of how the maximum recommended room air changes can be accomplished with a singular filter unit, such as is shown in FIG. 1, and a dual filter unit, as shown in FIG. 7.

|  | Single Filter Unit | Dual Filter Unit |
| --- | --- | --- |
| Fan rating at 1 inch pressure/load | 800 ft³/min | 1600 ft³/min |
| HEPA initial pressure/load per panel | 0.6–0.7 inches | 0.6–0.7 inches |
| Approximate filter face surface area | 8 ft² | 16 ft² |
| Nominal face velocity | 100 ft/min | 100 ft/min |
| Volume movement | 800 ft³/min | 1,600 ft³/min |
| Room volume (typical) | 2,400 ft³ | 4,800 ft³ |
| Fan motor horsepower | ≈⅙ | ≈⅓ |
| Room air changes/hour | 20 | 20 |

From the above, it can be seen that the unit can be designed with excess air capacity by choosing a fan rated to move the appropriate volume of air at a pressure loading greater than the pressure drop rating of the HEPA or ULPA filter, such as the 800 cubic foot per minute and 1,600 cubic foot per minute ratings above. As can be appreciated, motor horsepower is chosen for an appropriate level of quiet and efficiency. Any suitable voltage regulating device for the fan motor, such as the control means 28 (e.g., triac, rehoestat or the like), can then be used to adjust the flow of air through the unit to the desired initial level, enabling fan speed to be increased to compensate for additional pressure drop caused as the filter starts to be loaded by its collection of particulates from the room air stream. If the fan includes a multispeed motor, the control means 28 can be a multispeed switch. As can be appreciated, the control means 28 can even be calibrated using simple mathematics for different room sizes so that the user can set the control for the particular room size in which the unit is being used. And, with the addition of casters (not shown) beneath the base of the unit, it becomes a conveniently portable, local filtration unit adaptable for hospital or physician waiting rooms, emergency isolation rooms, or anywhere that there is a risk of infectious airborne contaminants.

Figure 6:
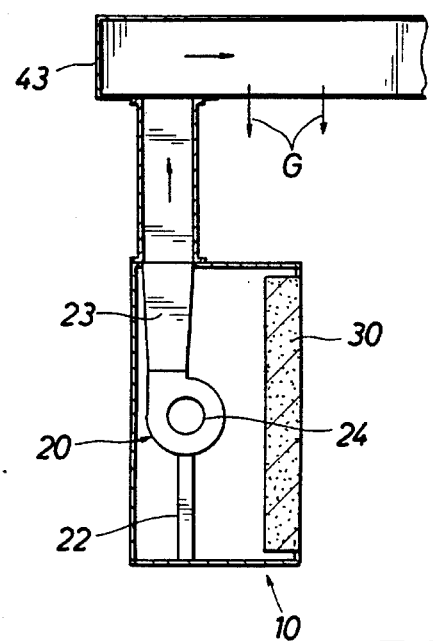
FIG. 6 is a side, cross-sectional view of an embodiment of the invention illustrating use in conjunction with a membrane panel diffusion ceiling system.

Turning now to FIGS. 3 through 6, as illustrated, the unit of the present invention can be used in a negative or neutral pressure environment, or anything in between. The unit can be used to create a neutral pressure environment, as shown in FIG. 3, by including a standard diffuser, such as diffuser 26 shown in FIG. 7 to take air from and give air back to the same space. To create a negative pressure environment to constantly draw air into the room from outside sources, the outlet 40 can be directly ducted, e.g., by duct 41 to discharge the unit's exhaust somewhere other than the room, such as to a central ventilation exhaust system as illustrated in FIG. 4. As illustrated in FIG. 5, if desired, the outlet 40 can be ducted with a T duct 42 so that part of the unit's purified air is returned to the room (E) and part to the central system (F) to create a partially negative pressure environment. An adjustable deflector or damper can be provided within the T duct to provide for adjustment of the portions of air returning to the room (E) and to the central system (F). As illustrated in FIG. 6, the unit can also be used in conjunction with a membrane ceiling plenum system, such as the system 43, by directly ducting its purified air into the plenum 43 for return to the room at a point distant from the unit for improved distribution of clean air. Using the corner air filtration unit of the present invention in conjunction with a membrane ceiling plenum system is likely to provide the cleanest air environment among the described embodiments.

As can now be appreciated, the present invention is a versatile, portable air filtration unit which can be used either as a stand alone unit or in conjunction with a central exhaust system or a ceiling plenum system, which is not limited to the particular fan sizes, filter sizes or arrangement of parts described above and many changes in these parameters can be made without departing from the spirit of the invention, the scope of which is defined by the following claims:

What is claimed is:

1. A room air filtration unit comprising:

a triangular housing having a triangular base, triangular top wall having an exhaust opening therein, and rectangular side walls wherein the housing defines a substantially open front face;

a high efficiency particulate air filter mounted over the open front face of the housing to cover the front face; and a fan assembly mounted within the housing for drawing unpurified air into the housing through the filter and exhausting substantially purified air through the top wall opening, wherein the fan assembly has a rated pressure loading at least equal to the pressure drop rating of the high efficiency particulate air filter.

2. The unit of claim 1 further comprising an air diffuser mounted within the top wall exhaust opening.

3. The unit of claim 1 further comprising means for mounting an exhaust duct over the exhaust opening.

4. The unit of claim 3 further comprising a duct mounted to the top wall wherein the duct includes a top opening and a side opening.

5. The unit of claim 1 further comprising means mounted to the housing for controlling the speed of the fan.

6. The unit of claim 1 further comprising a germicidal ultra violet radiation lamp mounted within the housing between the front opening and the fan assembly.

7. The unit of claim 1 wherein the fan assembly includes a fan housing joined to a fan motor by way of shock absorbing means, for quiet operation.

8. The unit of claim 1 wherein the filter includes a first frame section for mounting the filter over the front face of the housing and a second frame section for securing a high efficiency air filter medium therein, wherein the second frame section is sized to fit into the first frame section in sealing engagement therewith.

9. A room air filtration unit comprising:

a triangular housing having a triangular base, triangular top wall having an exhaust opening therein, and rectangular side walls wherein the housing defines a substantially open front face;

means for mounting an ultra low penetration air filter over the open front face of the housing to cover the front face; and a fan assembly mounted within the housing for drawing unpurified air into the housing through the filter and exhausting substantially purified air through the top wall opening, wherein the fan assembly has a rated pressure loading at least equal to the pressure drop rating of the ultra low penetration air filter.

10. The unit of claim 1 further comprising a duct for mounting over the exhaust opening and for connection to a membrane ceiling plenum.

11. The unit of claim 10 further comprising a membrane ceiling plenum connected to the duct.

12. The unit of claim 9 wherein the filter includes a first frame section for mounting the filter over the front face of the housing and a second frame section for securing an ultra low penetration air filter medium therein, wherein the second frame section is sized to fit into the first frame section in sealing engagement therewith.

13. The unit of claim 12 further comprising an air diffuser mounted within the top wall exhaust opening.

14. The unit of claim 12 further comprising means for mounting an exhaust duct over the exhaust opening.

15. The unit of claim 14 further comprising a duct mounted to the top wall wherein the duct includes a top opening and a side opening.

16. The unit of claim 12 further comprising means mounted to the housing for controlling the speed of the fan.

17. The unit of claim 12 further comprising a germicidal ultra violet radiation lamp mounted within the housing between the front opening and the fan assembly.

18. The unit of claim 12 wherein the fan assembly includes a fan housing joined to a fan motor by way of shock absorbing means, for quiet operation.

19. The unit of claim 12 further comprising a duct for mounting over the exhaust opening and for connection to a membrane ceiling plenum.

20. The unit of claim 19 further comprising a membrane ceiling plenum connected to the duct.

* * * * *